UNITED STATES PATENT OFFICE.

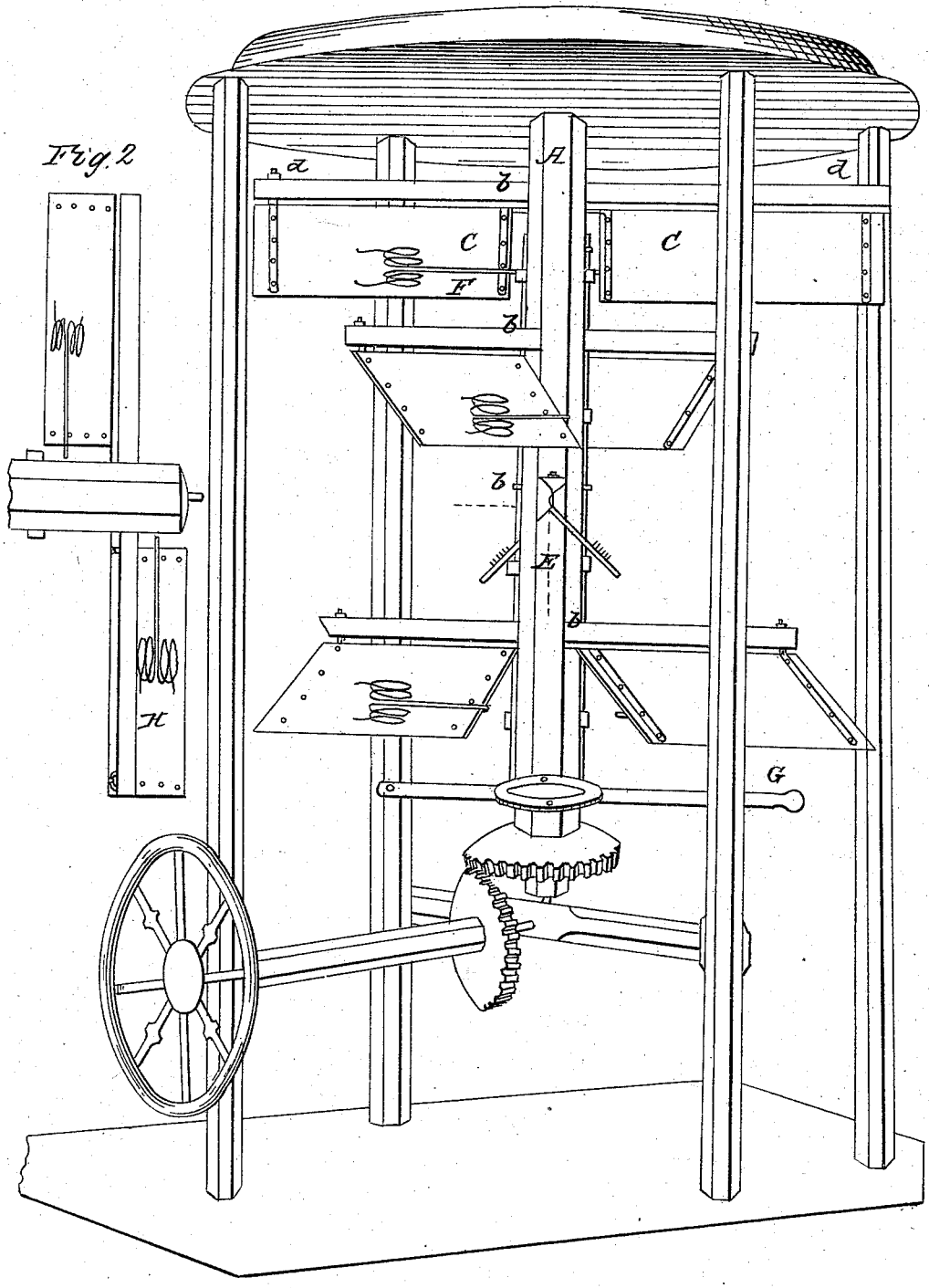

MARCUS FRISBEE, OF RENSSELAERVILLE, NEW YORK.

IMPROVED WINDMILL.

Specification forming part of Letters Patent No. 15,805, dated September 30, 1861.

*To all whom it may concern:*

Be it known that I, MARCUS FRISBEE, of the town of Rensselaerville, in the county of Albany and State of New York, have invented a new and useful Improvement on a Machine called and known as a "Windmill;" and I do hereby declare that the following is a full and exact description thereof, reference being had to the accompanying drawings, and to the letters of reference marked thereon.

The nature of my invention (and which I claim as an improvement upon any windmill heretofore in use) consists in the structure of the wings more especially and upon their mode of operating, so as to give the greatest amount of power in the smallest possible space.

To enable others skilled in the art to make and use my improvement or invention, I will proceed to describe its construction and operation.

It is constructed with an upright shaft, as shown at A in the accompanying drawing marked Figure 1, which, for convenience, may be made eight square, through which is framed any number of horizontal arms, one below the other, in a winding manner, as shown at $b\,b\,b\,b$ in the accompanying drawing marked Fig. 1. This serves to bring the pressure equal on all sides of the shaft as it turns in the wind. To each of these arms is hung a pair of wings, as shown at $c\,c$ in the accompanying drawing marked Fig. 1, made of wood or metal, about half as wide as they are long, connected together with a round rod or gudgeon running through the shaft under the center of the arm, each end of which is flattened and turned down across the inner end of the wings and riveted through, which serves as a stiffener to the wings, and if they are wood will keep them from splitting. The outer ends of the wings are hung with a strap hinge or eye, which runs across the wing and is riveted through. The upper part is a staple with an eye running up through the arm and secured by a nut, as shown at $d\,d$ in the aforesaid drawing, hereto annexed. The wings are made dishing by turning up the edges if made of metal, or if made of wood by fastening strips or pieces of wood or other material around the edge, say two inches wide, (for a six-foot wheel,) which serves to catch the wind and render the wheel much more powerful than it otherwise would be. The wings are secured at right angles, as represented by an end view, as shown at E in the aforesaid drawing, hereto annexed, when hanging natural upon the arms. When in operation, they hang as represented by the dotted lines at E in the aforesaid drawings, which allows the wing to turn with perfect ease. Thus while the dishing side of one of the wings receives the full force of the wind, the wing that swings on the same rod or gudgeon on the opposite arm or end of the arm stands edgewise to the wind.

F represents in the aforesaid drawing a spring fastened near the lower edge of the wing and running toward the shaft a little past the edge of the wing, so that when brought into a line with the shaft by the operation of the wind hits a stop, and is kept in that position with a moderate wind until, the shaft moving round, the wind begins to press on the opposite side of the wing, when it gives way and the opposite wing on the same arm takes its position. When the wind is too strong, the spring allows the wing to take an oblique position to the wind, while the opposite wing is thrown above the arm, as seen at H in the accompanying drawing marked Fig. 2, which takes a portion of the wind and serves as a perfect regulator. The above-named stops are fastened to two flat rods running up on two opposite sides of the shaft, which are secured by loops driven into the shaft, so as to allow the rods to move up and down. To the lower end of these rods is a ring or circle secured, which encircles the shaft, to which a lever is brought to bear, by means of which the wings are thrown out of gear in a moment at the will of the operator, as shown at letter G in the aforesaid drawings hereto annexed.

What I claim as my invention, and desire to secure by Letters Patent, is—

The combination of the spring on the sails with the adjustable or shifting straps operated by the lever, in the manner and for the purposes set forth.

MARCUS FRISBEE.

Witnesses:
ALONZO SPALDING,
GILBERT TITUS.